Figure 1:
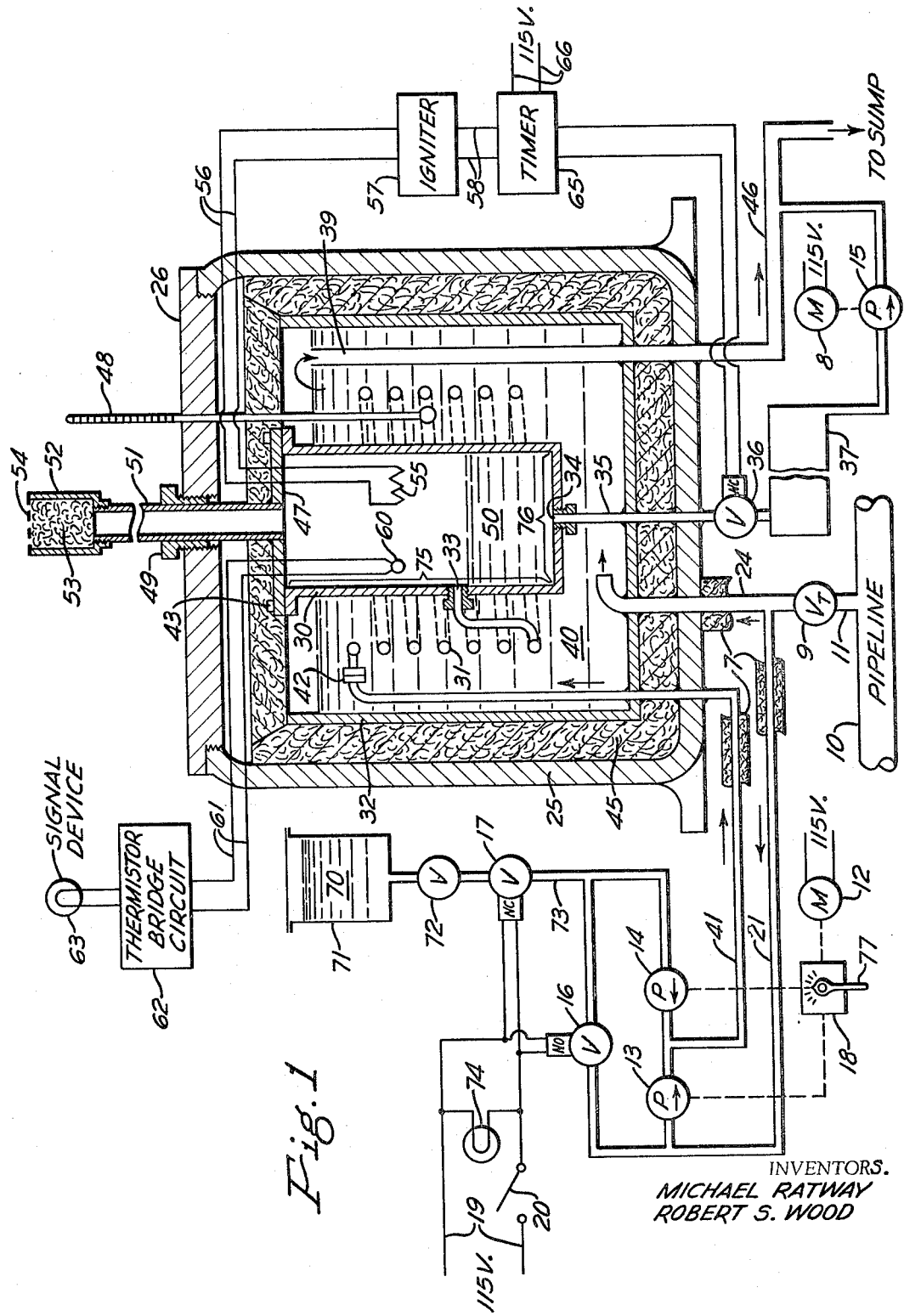

INVENTORS.
MICHAEL RATWAY
ROBERT S. WOOD 3,293,904
FLASH-POINT DETECTOR FOR OPERATION AT PIPELINE TEMPERATURE
Michael Ratway and Robert S. Wood, O'Hara Township, Allegheny County, Pa., assignors to Gulf Research & Development Company, Pittsburgh, Pa., a corporation of Delaware
Filed Oct. 21, 1965, Ser. No. 499,753
9 Claims. (Cl. 73—36)

This is a continuation-in-part of application Ser. No. 362,721 filed April 27, 1964.

This invention relates to method and apparatus for detecting the flash-point of fuel and in particular relates to an improved flash-point detecting method and apparatus that is particularly advantageous in pipeline operation to monitor the passing of an interface between two transported fluids with respect to the flash-point of the pipeline fluid, and which circumvents the need for elaborate temperature controls.

Many fuels are customarily identified by their flash-point which is always specified for any given fuel. The flash-point is the minimum temperature at which under specified standard conditions vapors of the fuel overlying the liquid fuel can be ignited with a specified standard type of ignition device. It is well known that the flash-point of diesel fuel is higher than that of kerosene which in turn is higher than that of gasoline. The flash-point is customarily determined in the laboratory by using a standardized amount of fuel in a standardized apparatus. In the prior-art flash-point determining apparatus the temperature of the fuel is gradually increased until a standard flame produces a flash at which point the fuel temperature is read. The apparatus is then cleaned and the test repeated for the next sample. This is evidently a time-consuming procedure that is not well adapted to automatic operation for control purposes because each time a flash occurs the apparatus must subsequently be substantially dismantled and cleaned out if reliable flash-point determinations are to be obtained. In an attempt to make automatic flash-point determinations an apparatus has been proposed through which the fuel flows continuously, as in United States Patent No. 2,627,745. Such apparatus is, however, susceptible to variation in observed flash-point because no reliable provision is made to scavenge the burned gases after a flash. In addition, such apparatus is not readily adaptable to monitoring a pipeline interface when the latter represents a transition from a fuel that has one flash-point to a fuel that has another flash-point. These and other shortcomings of prior-art apparatus are largely remedied in the apparatus of this invention.

In the operation of pipelines for the transport of liquid fuels it is customary to pump different types of fuels in succession through the pipeline. The so-called interface between two conterminously flowing miscible liquids gradually becomes diffuse so that instead of a sharp boundary at the "interface" there is a gradual transition from one liquid to the other. At a receiving station the physical and chemical characteristics of the pipeline liquid thus gradually change from that of the leading liquid to that of the trailing liquid. If at the receiving station it is desired to switch the several liquids to different destinations, tanks, or the like, the operator is faced with the problem of determining the instant at which to make the switch or "cut." One basis for determining the cut-point is to sample the pipeline liquid arriving at the station and perform some physical test to identify the nature of the liquid. Such tests as specific gravity, dielectric constant, color, etc. have been employed. A physical characteristic that is especially desirable for such a test is flash-point for the reason that that is a characteristic of fuels whose significance is well understood in the art, especially by customers that use the fuel. On the other hand as previously indicated, the flash-point measurement as made in the prior art is not adaptable to automatic pipeline operation. This invention provides a method of monitoring passing of an interface between two conterminously flowing liquid fuels that is based on flash-point determination, but which is fast and accurate and adaptable to either automatic or manual pipeline switching operations.

The present invention is an improvement over the invention disclosed and claimed in United States Patent Application Ser. No. 362,721 filed April 27, 1964, by the same inventors and assigned to the same assignee as the present application, and the present application is a continuation-in-part of said prior application. In said prior application a sample of pipeline fluid is heated to a temperature intermediate the flash-points of the two pipeline fluids whose cut-point is to be determined and ability of the sample to flash at this temperature is determined. The apparatus of said prior application requires an expensive thermostated constant-temperature bath and the rate at which flash tests are made is dependent on the rate at which the sample can be heated to the bath temperature. In the present invention both of these objections have been overcome.

We have discovered that the temperature of the flowing liquid in a long pipeline that transports substantial quantities of liquids is very nearly constant and exhibits only slow seasonal variations. This phenomenon is employed in the present invention in the place of a thermostated bath at high temperature. Inasmuch as the temperature of the pipeline fluid may be above or below its flash-point, the invention provides for blending with the pipeline fluid a liquid having a different flash-point whereby under proper conditions the blend will just flash at the pipeline temperature.

Accordingly, it is an object of this invention to provide an automatic flash-point detecting apparatus of improved convenience and reliability.

It is another object of this invention to provide an automatic flash-point detecting apparatus adapted to provide a reliable signal from which an operator can determine the cut-point in pipeline operation.

It is a further object of this invention to provide an automatic flash-point detecting method and apparatus that is capable of providing a plurality of indications during passage of an interface between a fuel that has a high flash-point and one that has a low flash-point in pipeline operation.

It is a further object of this invention to provide an automatic flash-point detecting method and apparatus that is capable of providing a plurality of indications during passage of an interface between a fuel that has a low flash-point and one that has a high flash-point in pipeline operation.

It is a further object of this invention to provide a flash-point detecting method and apparatus that provides a plurality of signal indications during passage of an interface between two conterminous fuels in a pipeline.

It is a further object of this invention to provide a method and apparatus that is capable of indicating a plurality of points in a pipeline interface at which the interface liquid has different predetermined flash-points.

It is a still further object of this invention to provide a method and apparatus that is capable of indicating a plurality of points in a pipeline interface at which the interface liquid has different predetermined flash-points without requiring that the liquid actually reach these temperatures.

It is a still further object of this invention to provide a method and apparatus that is capable of indicating a plurality of points in a pipeline interface at which the interface liquid has different predetermined flash-points and which circumvents the need for thermostated test conditions.

Figure 2:
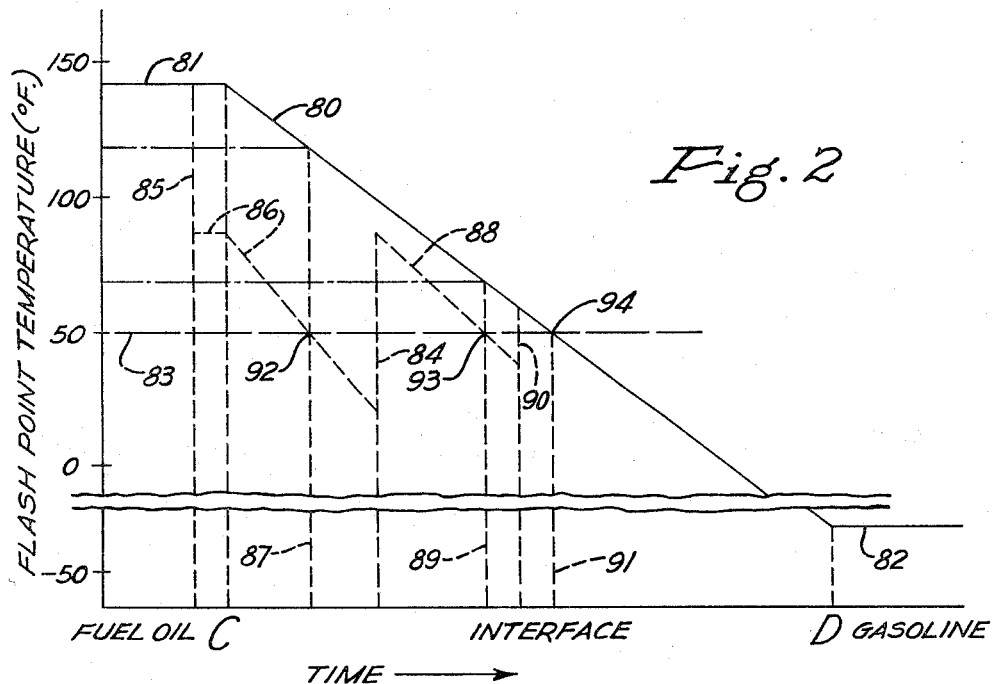
Figure 3:
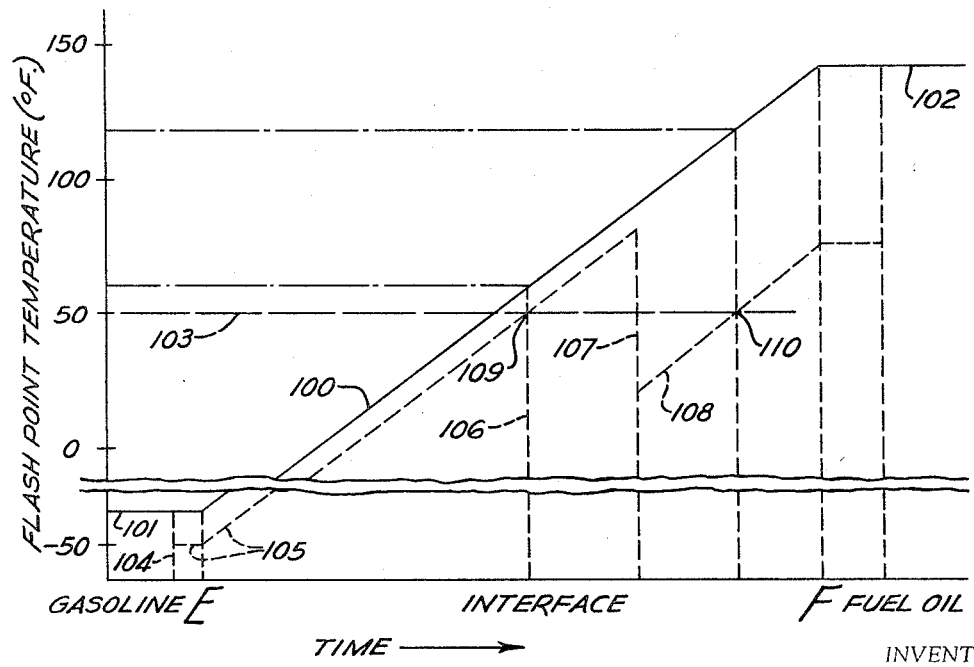

These and other useful objects are attained by the method and apparatus of this invention as described in this specification of which the drawings form a part and in which FIGURE 1 is a schematic diagram of the flash-point apparatus of this invention;

FIGURE 2 is an idealized diagram illustrating application of the method of this invention to an interface between fuel oil followed by gasoline; and FIGURE 3 is an idealized diagram illustrating application of the method of this invention to an interface between gasoline followed by fuel oil.

The apparatus of this invention comprises a flash-cup that is provided with a fuel entrance port and a fuel exit port. Fuel continuously enters the entrance port, but is only periodically withdrawn through the exit port. When the fuel is withdrawn, the air and gases in the flash-cup are also scavenged. In this manner the flash-cup is provided with fresh air for each accumulation of fuel on which a flash test is to be made so that the test closely approximates the standard ASTM flash-point test. At a predetermined interval just prior to withdrawal of liquid from the flash-cup an igniter is operated to ignite any vapors that will flash, a flash being detected by a sensitive temperature indicator. The flash-cup is contained in a bath through which the pipeline fluid flows so that the flash-cup is at pipeline temperature. A timer controls the sequence of operations. In the method of this invention provision is made to blend with the incoming interface liquid a liquid fuel whose flash-point is different from that of the interface components. The blending liquid is mixed with the interface liquid in such ratio as to bring the flash-point of the mixture to such a value that during passing of the interface past the sampling point the flash-point of the mixture will vary from one side of the bath (pipeline) temperature to the other side of the bath temperature. The blending ratio is adjusted so that the mixture will flash at one or more locations along the interface between the two fuels in the pipeline and between which a cut-point is to be established. The invention provides the pipeline operator with indications when the changing pipeline liquid in an interface attains different predetermined flash-points whereby the invention monitors passing of the interface between the two fuels in the pipeline. By properly choosing the blending ratio and blending liquid, pipeline cuts can automatically be made with respect to the respective indications obtained by means of this invention.

In conventional flash-point measuring apparatus the sample is placed in a flash-cup and the temperature of cup and contents is slowly increased at a standard rate until the vapors flash when tested with a standard flame. This method is much too slow if repeated tests are to be made on a succession of samples in order to determine the cut-point between two fuels having different flash-points in a pipeline switching operation. In this invention the temperature of the flash-cup is maintained substantially constant at the temperature of the pipeline liquid circulated therethrough. We have found that the temperature of the pipeline liquid varies only slowly from season to season, but remains substantially constant during the time required for passage of an interface. In the method of this invention two or more signal indications are obtained regardless of whether the leading component has the higher or lower flash-point, thus materially increasing the reliability of the cut-point determination. Inasmuch as the pipeline liquid itself is employed to maintain the temperature of the flash-cup, the invention avoids the need for thermostat and heating equipment, thus circumventing the attendant hazards and expense. In the ensuing description of this invention the novel apparatus will first be described in detail and followed by a detailed description of the novel method of using it in pipeline operation to monitor passing of the interface between two conterminous liquid fuels.

Referring to FIGURE 1, a tap 11 provided with a throttling valve 9 is connected to the pipeline 10 and continuously withdraws a sample of the liquid flowing under pressure in the pipeline 10. The tap 11 and substantially all of the piping connected thereto is covered by conventional thermal insulation 7 of high quality in order to minimize any change of temperature of the pipeline liquid drawn off by tap 11. A constant-speed motor 12 drives a pair of pumps 13 and 14 through an adjustable differential gear box 18 that is provided with a calibrated control handle 77 which adjusts the relative pumping rates of the pumps 13 and 14 while maintaining the sum of their speeds substantially constant. The pumps 13 and 14 are precision constant-volume metering pumps and are connected in a pipe network as shown including electrically actuated solenoid valves 16 and 17. The valve 16 is of a normally open type that is closed when electrically energized. Valve 17 is of a normally closed type that is open when energized. Valves 16 and 17 are energized from the power source connected to terminals 19 and are simultaneously controlled by switch 20. A pump 15 driven by motor 8 is of a type that has a much higher volumetric rate than pumps 13 and 14 and is adapted to pump either liquid or gas. The pump 15 need not be of a precision type.

For the immediately ensuing description it will be assumed that switch 20 is open and that valves 16 and 17 are not energized, so that valve 16 is open and valve 17 is closed. Accordingly, in this situation pumps 13 and 14 will withdraw a sample of pipeline liquid through tap 11 and the sample will flow through pipe 21 and pipe 41 to be delivered to the flash-point apparatus generally indicated inside a casing 25. The apparatus illustrated in FIGURE 1 is preferably located close to the pipeline itself so as to minimize time delay between withdrawal of a sample from the pipeline 10 and its delivery to the flash-point apparatus inside the casing 25. It will be evident to those skilled in the art, however, that the apparatus may be remotely controlled and monitored at a control console in the pipeline dispatcher's office if desired by employing well-known telemetering techniques.

The flash-point apparatus is contained in an inner container 32 that is substantially entirely surrounded by thermal insulation 45 and is inside the casing 25, the latter being of conventional explosion-proof construction. The casing lid 26 is provided with a central opening and packing gland 49 for a stack 51. A metal flash-cup 30 is fastened to a plate 47 carried on the lower end of the stack 51 as by means of screws 43 as indicated. The pipe 41 passes through a hole in the bottom of casing 25 and container 32 and is connected at its upper end by a union 42 with helical pipe 31 preferably of copper or other good heat conductor. The lower end of the helical pipe 31 leads into the flash-cup 30 at an inlet opening 33. The inlet opening 33 is located in the side of the cup 30 at a point substantially above the bottom of cup 30 and preferably in the region between one-third and one-half way between the bottom and top of the cup 30. At substantially the center of the bottom of cup 30 an outlet opening 34 is connected to a pipe 35, which passes through holes in container 32 and casing 25 to a normally closed solenoid-actuated valve 36. A closed container or tank 37 is connected between the valve 36 and pump 15. Discharge from the pump 15 goes to a discard sump.

The inner container 32 is connected via thermally insulated pipe 24 to the pipeline tap 11 through the throttling valve 9. Pipeline liquid under pipeline pressure flows through tap 11 and throttling valve 9 into the container 32 through pipe 24 whose inner end is turned tangentially to the wall of the container 32 in order to impart a swirling motion to the liquid 40 in container 32. The pipeline liquid leaves the inner container 32 through over-flow 39 and pipe 46 and discharges to a sump. The pipeline liquid 40 circulating through the container 32 thus itselefe forms a constant temperature bath for the flash-cup 30. We have found that the pipeline liquid changes temperature but very slowly over a range that generally is less than 1° F. per day, and varies seasonally over a range that is generally less than 25° F. even in areas where frost occurs. The outside of container 32 is provided with thermal insulation 45 of high quality, and the pipes 24, 21, and 41 are all well insulated. A thermometer 48 is provided in order that the operator will be aware of the operating temperature of the apparatus. While indicated as a thermometer, it is apparent that a thermocouple type of remote reading temperature indicator may be employed. The plate 47 and casing 25 are provided with appropriate openings through which the electrical leads are brought by means of seals or conduits (not shown) to meet explosion-proof requirements.

Due to the normal pipeline pressure there is substantial circulation of pipeline liquid 40 in the container 32 so that the liquid 40 is at normal pipeline fluid temperature and forms a bath of substantially constant temperature during the relatively short time required for passage of an interface.

It is apparent that the sample of pipeline liquid withdrawn through tap 11 and pipe 21 by pumps 13 and 14 passes through pipe 41 and helix 31 in the bath 40 and thereby attains a temperature substantially the same as that of the liquid 40, i.e. the temperature of liquid in pipeline 10. The length and diameter of the pipe in helical coil 31 is designed so that the liquid flowing therethrough attains the temperature of bath 40 to sufficient accuracy for all practical purposes. By way of example, the helical coil 31 may comprise five feet of ¼ inch I.D. copper tubing. A liquid flow rate through coil 31 of 135 cc./minute has been found satisfactory. The liquid whose flash-point is tested in the inner cup 30 is indicated in the figure by 50. The test liquid 50 is thus maintained at substantially pipeline temperature.

The cover plate 47 of the flash-cup 30 is fastened at its center to a stack 51 provided at its upper end with a conventional flash arrester 52 containing metal wool or gauze 53 held in place by a perforated cover 54. The stack 51 provides access of air downward through the flash arrester 52 and stack 51 to the interior of cup 30. Also, when vapors in the cup 30 above liquid 50 are ignited, the stack 51 allows for expansion of the resulting burned gases. A gland fitting 49 provides a seal between stack 51 and lid 26. The stack 51 is of sufficient length to exhaust burnt gases to a safe location but should not be so long as to prevent access of clean air to the flash-cup 30 when the latter is scavenged as will become evident later.

Inside the flash-cup 30 at a level higher than that reached by liquid 50 and preferably above the inlet opening 33, there is located an igniter 55 that is connected by means of leads 56 to an appropriate source of power 57. The igniter 55 may be of any conventional type, as for example a sparking plug connected to a high-tension supply 57 or an incandescent filament energized from a low-voltage power source 57. The ignition source 57 for the igniter 55 is periodically energized by connection through leads 58 to a timer 65 whose cycle will be described later. It is apparent that with a sample 50 in the cup 30 the overlying vapors may be periodically tested for flash by energization of the igniter 55. If a flash occurs, there will be substantial rise in temperature of the gases inside the cup 30, and such temperature rise will be detected by means of a flash detector comprising temperature-sensitive element 60 connected by means of leads 61 to a conventional indicator circuit 62 that is provided with a visual or other type of indicator such as signal lamp 63. The element 60 may conveniently be a conventional thermistor connected to a bridge circuit 62 which in conventional manner indicates a small temperature rise by energization of indicator lamp 63. In this manner lamp 63 will momentarily light as a signal each time a flash occurs. Since the thermal capacity of thermistor 60 is quite small it will quickly cool after a flash has occurred.

By way of example, a cylindrical flash-cup 30 having an inside diameter 76 of two inches and a height 75 of five inches has been found satisfactory. As previously indicated, the inlet opening 33 is located between one-third and one-half way from the bottom of the cup and may, for example, be two inches from the bottom. The igniter 55 is located in the upper portion of the cup 30 so as to always be above the level of liquid 50 and is preferably at least one inch above the maximum level attained by liquid 50. Thus if the latter does not rise above the level of inlet opening 33, the igniter 55 may be one inch above the opening 33. The diameter of stack 51 is such as to allow free access of air when the cup is purged, and may, for example, have an inside diameter of ¾ inch. The flash detector 60 employed for detecting flash may, for example, be a Type 31E9 thermistor made by Victory Engineering Corporation, Springfield, New Jersey, U.S.A. The thermistor 60 is located to always be above the level of liquid 50. Preferably the thermistor 60 is located near a side of the cup diametrically opposite to the location of igniter 55 and at about the same level; in the cup as igniter 55.

The timer 65 which derives power from house current on leads 66 periodically energizes the ignition source 57 and at a different time periodically energizes normally-closed solenoid valve 36 thereby to open valve 36. It is apparent that with valve 16 open and valve 17 closed, and with pumps 13 and 14 running continuously, fuel will be pumped into the cup 30 at a uniform continuous rate. Valve 36 is normally closed so that continuously running pump 15 will evacuate liquid and gas from tank 37 to produce therein a low pressure. Operation of the timer 65 is arranged to allow the liquid 50 to accumulate in cup 30 until it reaches a level proximately below the inlet opening 33, after which the timer energizes the ignition source 57 thereby energizing igniter 55 to test the vapors above liquid 50 for possible flash. The timer 65 is arranged so that a short time interval subsequent to a flash test the timer energizes and thereby opens valve 36, thereby connecting the interior of cup 30 to tank 37. The volume of tank 37 (not to scale in the drawing) is substantially greater than the combined volume of cup 30, pipe 35, stack 51, and flash arrester 52, so that when the valve 36 opens, all of the liquid and vapor contents of cup 30 are withdrawn into the tank 37. The valve 36 remains open a sufficient time to permit complete withdrawal of the contents of pipe 35, cup 30, stack 51, and flash arrester 52 and also to draw fresh air into cup 30, after which valve 36 is de-energized and closes. Continuously running pump 15 then removes the contents from tank 37 and again evacuates the tank so that it is ready to repeat the cycle. It is further apparent that with pumps 13 and 14 running continuously the cup 30 will gradually fill to a level proximately below the opening 33, whereupon the vapors will be tested for ignition. Subsequently, both the liquid and vapor contents of flash cup 30 are completely scavenged and the cup is purged with fresh air. The relative volumetric rates of pumps 13 and 14, as compared to that of pump 15 and the capacity of tank 37, are arranged so that evacuation of the cup 30 takes place rapidly compared to the flow of liquid into the cup 30 through pipe 41. In this way the cup 30 is emptied of liquid and flushed with air at regular intervals between which the cup is allowed to accumulate liquid 50. In this manner each batch of liquid 50 is also provided with a fresh charged of air and this insures that a reliable flash-point measurement is made by the apparatus of this invention. The flash test by energization of igniter 55 is made just prior to opening of valve 36 so that the flash test is made on each batch of liquid introduced into the cup 30. As previously mentioned, the occurrence of a flash is indicated by signal lamp 63.

By way of example, the following timing cycle has been satisfactorily employed when operating with conventional petroleum type fuels. The cycle starts at zero time when valve 36 is de-energized. The continuously running pumps 13 and 14 are designed so that together they fill cup 30 with liquid to a height of about one-third full in about thirty seconds. In the meantime continuously running pump 15 has evacuated tank 37. At thirty seconds the timer 65 energizes ignition source 57 to energize the igniter 55. If a flash takes place, the operator is apprised of this fact by flashing of signal lamp 63. At thirty-five seconds the timer energizes valve 36 which opens, whereupon the liquid 50 plus any vapors in the elements 30, 51, and 52 are sucked into the tank 37 and cup 30 is filled with fresh air through stack 51. Complete scavenging of cup 30 takes about fifteen seconds, so that at fifty seconds valve 36 is again de-energized and closes. Subsequently, the cycle is continuously repeated. It is apparent that the cycle should be relatively short compared to the time required for an interface to pass the location of tap 11 in order that a substantial number of flash tests be made during passing of the interface. Passing of an interface commonly takes from thirty to one-hundred twenty minutes and a cycle period in the range between thirty and sixty seconds has been found satisfactory.

Inasmuch as the pipeline temperature of bath 50 will be below the flash-point of many liquid fuels commonly transported by a pipeline, it is necessary to mix with the interface sample entering the flash cup through pipes 21 and 41 a blending liquid 70 whose flash point is known. The blending liquid 70 is contained in a closed tank 71 whose outlet pipe is provided with a check valve 72 which permits flow of blending liquid 70 to the previously mentioned normally closed solenoid valve 17. The tank 71 is also provided with a vacuum breaker (not shown) at its uppermost point in order to admit air as liquid is withdrawn from the tank through pipe 73. In the system connected as shown in FIGURE 1, when switch 20 is closed, the valve 16 closes and the valve 17 opens. The pump 14 thereafter pumps the blending liquid 70 from pipe 73 into the pipe 41, while pump 13 pumps sample from pipe 21 into the pipe 41. However, the total flow through pipe 41 remains substantially the same as when switch 20 is open. Thus with switch 20 closed, the liquid in line 41 which enters the flash-point apparatus is made up of pipeline sample blended with a predetermined fixed percentage of the liquid 70. Thus the operator by opening switch 20 can cause sample alone to flow into the flash-point apparatus, or by closing switch 20 the operator can cause a predetermined mixture of sample and blending liquid 70 to enter the flash-point apparatus, with the respective rates of total liquid flow in pipe 41 being the same in each case. It is apparent that the blending ratio will depend upon the relative volumetric rates of pumps 13 and 14 as determined by the adjustment of differential gearbox 18. The blending liquid 70 may be any liquid which when mixed with an interface component whose flash-point is above the temperature of bath 40 will lower the flash-point of the mixture to a value that is proximate the temperature of bath 40.

For reasons that will become evident later, it may be desirable to employ more than one blending ratio during passing of an interface or for monitoring different types of interfaces, and for this purpose it is convenient to drive one or both pumps 13 and 14 through the previously described adjustable gear box 18 having calibrated control handle 77. By this means the operator may select the blending ratio desired. It may also be desirable to employ different blending liquids in monitoring different types of interfaces or during passing of an interface, and for this purpose additional tanks (not shown) may be provided, each tank containing a different blending liquid 70. Each tank 71 is equipped with a check-valve 72 and a normally closed solenoid valve 17, and the operator may select the blending liquid to be employed by means of a selector switch (not shown). An indicator light 74 is provided to monitor when blending is being performed, and if desired separate indicator lamps may be employed to indicate which respective blending liquid is being used.

With the timer 65 running and pumps 13, 14, and 15 running, and switch 20 open, the operator can tell whether or not the pipeline sample alone flashes at pipeline temperature. On the other hand by closing switch 20 the operator can tell whether the predetermined blend will flash at the pipeline temperature. The nature of the blending liquid 70 and the blending ratio employed for the respective types of interface detection will become evident later.

Two kinds of transitions of the flash-point of pipeline liquids commonly occur at interfaces, namely from a liquid of high flash-point (usually having a low vapor pressure) to a liquid of low flash-point (usually having a high vapor pressure), and vice versa. In making cuts the pipeline operator may monitor passing of the interface by periodically sampling the pipeline liquid and testing the sample for some characteristic physical or chemical property. For example, when testing the specific gravity of the pipeline liquid, there will be gradual change from the gravity of the leading component of the interface to that of the trailing component. A similar transition in flash-point occurs. It is customary for the pipeline operator to "cut" the transported product at two or more points in the interface. For example, when fuel oil is followed by gasoline, a high cut may be made soon after the gravity of the pipeline sample starts to fall, at which point the interface liquid is switched to a heavy-end tank. Somewhat later a middle cut may be made at about the middle of the interface, when the interface liquid is switched to a light-end tank. Finally at the end of the interface a low cut is made at which point the liquid is substantially all gasoline and is again appropriately switched. While various pipelines may make cuts or switches at various selected points along an interface depending on whether or not buffer liquids are inserted between batches, the method of using the invention will become clear by the ensuing description based on the above-mentioned cuts.

It is desirable to make the middle and the high cuts with respect to flash-point. By way of example, it will be assumed for purposes of explanation that the pipeline operator desires to make the high cut when the interface liquid attains a flash-point of 120° F. and further desires to make the middle cut when the interface liquid attains a flash-point of 65° F. However, the temperature of the bath 40 remains substantially constant at pipeline temperature which is usually between 40° F. and 65° F. In this invention, the blending liquid 70 and the blending ratio as determined by the adjustment 77 are predetermined so that at the temperature of bath 40 the point in the interface where the liquid 50 just begins to flash is representative of pipeline sample having a 120° F. flash-point. The other flash-points of the interface liquid are detected by blending with the interface sample a different predetermined proportion of blending liquid 70 and detecting ability of the liquid 50 to flash at the lower temperature (which is still above pipeline temperature) by detecting flash of the predetermined blend at the temperature of bath 40 i.e. pipeline temperature. Thus the 65° F. cut-point is indicated when the second predetermined blend attains a flash-point of the bath 40.

The method of using the blending operation to monitor the changing flash-point and/or to detect when the flash-point of the interface sample reaches more than one preassigned value will be described first, by way of example, with reference to an interface such as occurs when fuel oil is followed in the pipeline by gasoline. It is known that commercial No. 2 fuel oil, for example, has a flash-point in the range between 145% F. and 165° F., and that the flash-point of gasoline is considerably below ordinary pipeline temperature. As indicated above, the pipeline operator may decide to make the high cut at at flash-point of 120° F. and the middle cut at a flash-point of 65° F. By way of example for purpose of explanation, it will be assumed that the pipeline liquid and hence bath 40 is at a temperature of 50° F. Switch 20 is initially open. Thus at first, when the pipeline sample is 100 percent fuel oil, no flash will occur because the liquid 50 in cup 30 has a flash-point higher than the bath temperature.

Operation of this invention may be explained by reference to FIGURE 2 which is an idealized plot of flash-point of pipeline sample against time during passage of an interface between fuel oil followed by gasoline. The pipeline sample taken from the pipeline at the tap 11 (FIGURE 1) prior to time C is 100 percent fuel oil. Subsequent to time C and up to time D the pipeline sample will contain interface liquid which is a mixture of fuel oil and gasoline. Subsequent to time D the pipeline sample will be 100 percent gasoline. The curve 80 (FIGURE 2) is a plot of the transition of flash-point of the pipeline sample during the interface. Prior to time C the liquid sample withdrawn from the pipeline by tap 11 will have a high flash-point as indicated by the curve at 81. Subsequent to the time D the pipeline sample will have a much lower flash-point as indicated by the curve 82. (A discontinuity is shown in the plot of FIGURES 2 and 3 at low temperatures because of the very low flash-point of gasoline, the latter being only schematically indicated). During the interface interval, i.e. between the times C and D, the flash-point of the pipeline sample gradually changes from the value 81 to the value 82. The bath 40 (FIGURE 1) is at a temperature below the flash-point of fuel oil, and is for example at the previously mentioned pipeline temperature of 50° F. indicated by line 83 in FIGURE 2. It is apparent that in the region of the plot above the line 83 no flashing occurs because the flash-point of liquid 50 is above the temperature of bath 40, whereas in the region of the plot below the line 83 flashing will occur. The flash-point of the pipeline sample as the interface passes will gradually drop from 81 to 82 as indicated by the curve 80, and the operator wishes to know when the flash-point crosses the 120° F. line and the 65° F. line.

A short time before the interface is expected to arrive at tap 11, the operator closed switch 20 and the blending is started. The blending liquid may be naphtha E and only a small predetermined ratio of naphtha E, for example 6 percent, is required. The flash-point of the liquid 50 now jumps down to the level 86 as indicated by the dotted line 85 but the liquid 50 still does not flash. At time C the curve 86 turns downward due to the gasoline content of the interface liquid. As the pipeline sample continues to contain an increasing percentage of gasoline, the blended liquid 50 follows the dotted curve 86 which is roughly parallel to the curve 80. When the curve 86 crosses line 83 at point 92, flashing begins and is signalled by flashing of signal light 63 (FIGURE 1). The operator is thus apprised that the interface liquid at tap 11 has reached the 120° F., flash-point.

In order to observe the 65° F. flash-point, the operator changes the setting of the blending ration control arm 77 which changes the volumetric pumping ratio of pumps 13 and 14, so as to blend with a smaller predetermined amount of blending liquid 70, as for example only 1 percent of naptha E. Upon reducing the amount of blending naphtha, the curve 86 jumps up as indicated at 84. The new blending ratio is predetermined so that the flash-point of the blended liquid 50 is now above the bath temperature and consequently flashing ceases and the signal light no longer lights. The flash-point of blended liquid 50 now follows the curve 88 and the flash-point gradually falls as the interface sample contains more and more gasoline. As the time 89 the flash-point of blended liquid 50 again reaches the bath temperature of 50° F. and the vapors begin to flash, so that as the curve 88 crosses line 83 at point 93, flashing is again signalled by flashing of signal light 63 (FIGURE 1). The operator is thus apprised of the fact that the interface sample has reached the 65° F. flash-point.

It will be apparent that if desired the operator may subsequently open switch 20 and stop blending entirely, whereupon the curve jumps up again as indicated at 90 and no flashing occurs. The flash-point of the pipeline sample now follows the solid line 80 and at time 91 the sample contains sufficient gasoline so that flashing again starts at point 94, thus signalling a 50° F. flash-point. It is seen from FIGURE 2 that flashing of the first blend starts at the time 87, stops when the blending ratio is change at 84, and flashing starts again at the time 89. The times 87 and 89 (plus 91 if desired) are noted by the operator, or if desired, the current through signal light 63 may be automatically recorded on a chronograph in well-known manner for future reference. The operator has thus had a plurality of signals from which to gauge the switch, which in itself may require may minutes to complete because of the time required for motor-actuated valves to open and close. The apparatus thus monitors passing of the interface by a plurality of flash-point signal, namely, first flashing of signal lamp 63 indicating that the flash-point of the interface liquid has fallen to 120° F., and a second flashing of lamp 63 indicating that the flash-point of the interface liquid has fallen to 65° F. If desired, other flash-points can be monitored in similar manner by employing other blending liquids and other blending ratios. The operator may in well-known manner make the pipeline switch at an appropriately chosen time related to the times 87 and 89 indicated by the flash-detecting apparatus of this invention or may employ the flash signals to automatically effect the cuts. Ordinarily considerable time is required for the interface to traverse the location of tap 11 and actual switching may take place at some distance downstream from the tap 11 so that the operator will have ample time to make the switch at the chosen point on the interface. If desired, the switching can be initiated automatically by means of a relay sequence that for safety requires two or more flashes for operation in well-known manner.

The operator can by experiment devise more than one blending fluid 70, and a plurality of blending ratios, and can thus by changing blending fluid 70 or by employing a plurality of blending ratios obtain additional flash-point signals corresponding to any desired series of flash-points of the interface liquid if such further signals are desired for monitoring purposes or to make additional cuts. This invention permits doing this without changing the temperature of bath 40 which remains at pipeline liquid temperature. In this manner the invention provides a method and means for obtaining a plurality of signals based on the flash-point of the pipeline liquid as the interface progresses, whereupon the operator can be sure that the desired cuts or switches are made at the desired points of the interface.

The apparatus of this invention also provides an element of safety in that a pipeline sample containing a very high percentage of a very volatile fuel such as gasoline will not ignite in the flash-cup 30 because its vapors will be too rich to burn. Therefore, no harm results from inadvertently leaving the apparatus in operation after a cut-point is observed in going from fuel oil to gasoline.

The method of using the blending operation to obtain a plurality of flash-point indication for cut-point determinations when a liquid of low flash-point (high vapor pressure) is followed by a liquid of high flash-point (low vapor pressure) as for example, when gasoline is followed by fuel oil, is similar to a reverse of the above-described procedure. The bath 40 will have the temperature of the pipeline liquid, for example the bath 40 may be at 50° F. as in the previous example. The switch 20 is initially open so that no blending is employed. The pipeline sample, being rich in gasoline, will initially flash at the bath temperature of 50° F. As the interface progresses and the gasoline content of the interface decreases, the flash-point of the sample 50 eventually rises to about 50° F., whereupon flashing ceases and signal light 63 no longer indicates flashing. The time when flashing stops is noted by the operator and may be employed as a cut-point. The operator now closes switch 20 to begin the addition of a small predetermined ratio of blending liquid. The blended liquid 50 will then again flash. As the gasoline content of the interface further decreases, the vapors eventually again cease to flash as indicated by cessation of flashing of signal light 63, at which point the blending ratio is changed to a new predetermined ratio so as to contain more blending liquid 70, whereupon flashing again takes place. When the flashing again ceases, another cut-point is indicated.

FIGURE 3 diagrammatically illustrates the above-described procedure when gasoline is followed by fuel oil in the pipeline. Curve 100 shows the transition of flash-point of pipeline liquid with time as the interface progresses past the location of tap 11. Prior to time E the liquid drawn off by tap 11 is all gasoline having a low flash-point. Between times E and F the interface liquid has gradual transition from low flash-point to high flash-point. Subsequent to time F the pipeline liquid is all fuel oil having a high flash-point. Prior to time E the flash-point of the gasoline is indicated by the curve at 101 and subsequent to time F the curve indicates at 102 the flash-point of fuel oil. The bath 40 is at pipeline temperature, which may be 50° F. as indicated by line 103. As previously explained, the region above line 103 represents conditions under which no flashing takes place because the flash-point of the liquid 50 (FIGURE 1) is higher than the temperature of the bath 40. In the region below the line 103 flashing takes place.

A short time before the interface is expected to arrive at tap 11, the operator may close switch 20 and begin blending with a relatively small predetermined percentage of naphtha, as for example 1 percent naphtha E. Upon starting the blending at time 104 the flash-point of the blended liquid 50 drops down to the level 105. The blended liquid 50 flashes since its flash-point is below the temperature of bath 40. At the time E the flash-point of the blended liquid 50 starts upward and follows along the curve 105. At the time 106 the curve 105 crosses the line 103 at point 109 and flashing ceases as signalled by cessation of flashing of light 63. The operator is thus apprised that the interface liquid at tap 11 has reached the 65° F. flash-point. A short time thereafter, for example at time 107, the operator changes the setting of blending ratio control arm 77 so as to increase the amount of naphtha in the blended liquid 50 to a predetermined higher value, say 6 percent naphtha E. The new blend is such as to lower the flash-point of the blended liquid 50 to a value that is below the temperature of the bath 40. Upon doing so, the flash-point of the blended liquid is lowered and thereafter follows the curve 108. Flashing takes place until the curve 108 crosses the line 103 at point 110 whereupon flashing again ceases. Cessation of flashing of light 63 thus informs the operator that the flash-point of the interface sample at tap 11 has reached the 120° F. flash-point. The operator is thus provided with signals, namely at the time 106 when flashing first ceases, and the time corresponding to point 110 when flashing again ceases. These times are all noted by the operator, or if desired, the current through signal light 63 may be automatically recorded on a chronograph for future reference, or the signals may be employed to automatically initiate switching operations. The operator thus has a plurality of signal indications apprising him of passage of the interface, namely cessation of flashing at time 106 as the flash-point of the interface liquid exceeds 65° F., and a second cessation of flashing at time corresponding to point 110 as the flash-point of the interface liquid exceeds 120° F. It is apparent that if the time of additional indications representing lower or intermediate flash-points are considered desirable such can be obtained by employing no blending or by employing other appropriately designed blending liquids or blending ratios. The operator can in this manner monitor progress of the entire interface as it passes, thus greatly improving the reliability of the respective cut-points. Furthermore, the operator can make the pipeline switches at times that are related to the successive beginnings or endings of flashing, and this improves the switching efficiency and avoids wasteful discard at the time of switching.

It is preferred that the blending liquid 70 be a fuel of a type that is miscible in all proportions with both of the pipeline liquids involved in the interface. Inasmuch as most fuels are petroleum hydrocarbons which are mutually miscible, it is convenient to also use a hydrocarbon blending liquid. The blending liquid may itself comprise a blend of appropriate liquids as required to obtain the desired properties. It is preferred to use a blending liquid a hydrocarbon component that has a well-defined and standardized flash-point, as for example naphtha E.

It will be evident that the blending liquid and the blending ratio must be such that the gradual transition of flash-point of the interface liquid is successively modified so that the successive mixtures forming liquid 50 in the flash-cup 30 will have flash-points that repeatedly traverse the temperature of the bath 40 and the blending parameters are appropriately chosen to this end. The invention has been described by the way of example as employed to obtain a high cut-point and an intermediate cut-point, but it is apparent that other flash-points may be detected by employing other blending ratios. The blending liquid and the blending ratios employed are predetermined by experiment as will be apparent to those skilled in the art of blending fuels. For any two pipeline components and a given blending liquid, the blending ratio is that which produces an actual flash-point of the blend that differs from the flash-point of the component mixture by a known temperature differential. A table is then prepared from which the operator can read the correct blending ratios for determining flash-points of pipeline liquids at various temperatures of the bath 40. Inasmuch as the pipeline liquid and hence the bath 40 varies in temperature only very slowly, the blending ratios employed need not be altered very often.

It is to be noted that the respective flash-points are detected in this invention without changing the temperature of bath 40 from the normal temperature of the pipeline liquid. By way of example, a bath temperature of 50° F. has been assumed, but it is apparent that the temperature of bath 40 may have any value. In selecting the blending liquid and blending ratios the operator may take into account the fact that the flash-point as detected by the apparatus of FIGURE 1 may not coincide with that determined by conventional standard ASTM apparatus. These differences may easily be determined by a simple calibration test of the apparatus of FIGURE 1.

It will be evident that instead of employing an insulated casing 25 and bath 40 through which pipeline liquid is circulated at pipeline temperature, the flash-cup 30 may be immersed in the pipeline itself by providing an appropriate fitting in the pipeline to which the lid 26 may be fastened. In such event the inlet pipe 41 leading to coil 31 and outlet pipe 35 from the bottom of the flash-cup will be brought out through the lid 26, as well as wires 56 and 61. With the flash-cup 30 thus totally immersed in the pipeline the flash-cup and its contents will always be at pipeline temperature.

The method and apparatus of this invention circumvents the need for a thermostat, heating coil, and temperature control for the constant-temperature bath. In fact, because of the large heat capacity of the liquid in the pipeline the flash-cup will actually be maintained at a more constant temperature than is maintained by a conventional thermostat. Only a small quantity of blending fluid is required thus eliminating the need for large blending fluid tanks. No precautions need be taken against freezing of the apparatus because it is always at pipeline temperature and employs pipeline liquid to maintain this temperature.

What we claim as our invention is:

1. Apparatus for monitoring at a fixed location along a pipeline passing of an interface between two liquids of different flash-points flowing conterminously in the pipeline which comprises
- a flash-cup having an inlet connection in the side thereof intermediate the top and bottom thereof and having a drain connection in the bottom thereof,
- flow means connecting the pipeline to said inlet connection,
- means circulating pipeline liquid around said flash-cup whereby said flash-cup and the contents thereof are maintained at substantially pipeline temperature, said temperature being intermediate the flash-points of the two pipeline liquids,
- flash-ignition means in said flash-cup located above the level of the liquid sample in said flash-cup and adapted to be periodically energized,
- flash-detection means in said flash-cup located above the level of the liquid sample in said flash-cup,
- means connected to said flash-detection means indicating occurrence of a flash,
- withdrawal means connected to said drain connection and periodically energized to withdraw the liquid and vapor contents of said flash-cup through said drain connection, and
- a timer connected to said flash-ignition means and to said withdrawal means and adapted to respectively energize said flash-ignition means and said withdrawal means at predetermined time intervals.

2. Apparatus for monitoring at a fixed location along a pipeline passing of an interface between two liquids of different flash-points flowing conterminously in the pipeline which comprises
- means for sampling the liquid flowing past the fixed location along the pipeline,
- a flash-cup having an inlet connection in the side thereof intermediate the top and bottom thereof and having a drain connection in the bottom thereof,
- a constant-volume-rate pump,
- a bath substantially surrounding said flash-cup,
- flow means connecting the pipeline with said bath circulating pipeline liquid through said bath whereby said flash-cup is maintained at substantially pipeline temperature, said temperature being intermediate the flash-points of the two pipeline liquids,
- heat-exchange means in said bath,
- flow means including said constant-volume-rate pump and said heat-exchange means connecting said sampling means to said inlet connection,
- flash-ignition means in said flash-cup located above the level of the liquid sample in said flash-cup and adapted to be periodically energized,
- flash-detection means in said flash-cup located above the level of the liquid sample in said flash-cup,
- means connected to said flash-detection means indicating occurrence of a flash,
- withdrawal means connected to said drain connection and periodically energized to withdraw the liquid and vapor contents of said flash-cup through said drain connection, and
- a timer connected to said flash-ignition means and to said withdrawal means and adapted to respectively energize said flash-ignition means and said withdrawal means at predetermined time intervals.

3. Apparatus for monitoring at a fixed location along a pipeline passing of an interface between two liquids of different flash-points flowing conterminously in the pipeline which comprises
- means for sampling at a constant volume rate the liquid flowing past the fixed location in the pipeline,
- a source of liquid having a known flash-point,
- mixing means connected to said source and to said sampling means continuously mixing said liquid with said sample in a predetermined volumetric ratio,
- a flash-cup having an inlet connection and a drain connection,
- flow means connecting said mixing means to said inlet connection,
- a bath substantially surrounding said flash-cup,
- flow means connecting the pipeline with said bath circulating pipeline liquid through said bath whereby said flash-cup is maintained at substantially pipeline temperature,
- flash-ignition means in sai flash-cup located above the level of the liquid sample in said flash-cup and adapted to be periodically energized,
- flash-detection means in said flash-cup located above the level of the liquid sample in said flash-cup,
- means connected to said flash-detection means indicating occurrence of a flash,
- withdrawal means connected to said drain connection and periodically energized to withdraw the liquid and vapor contents of said flash-cup through said drain connection, and
- a timer connected to said flash-ignition means and to said withdrawal means and adapted to respectively energize said flash-ignition means and said withdrawal means at predetermined time intervals.

4. A method of monitoring at a fixed location along a pipeline passing of an interface between a liquid of low flash-point followed conterminously in the pipeline by a liquid of high flash-point which comprises
- continuously sampling the pipeline liquid at the fixed location,
- blending with the sample a known liquid in known amount to produce a first blend whose flash-point is proximately below the pipeline temperature,
- detecting the substantially continuous flashing of said first blend,
- determining the instant when said first blend ceases to flash at pipeline temperature,
- blending with the sample a known liquid in known amount to produce a second blend whose flash-point is proximately below the pipeline temperature,
- detecting the substantially continuous flashing of said second blend, and
- determining the instant when said second blend ceases to flash at pipeline temperature whereby said instants provide a basis for determination of the passage of said interface.

5. The method of claim 4 wherein said first and second blends are made with the same known liquid in different proportions.

6. The method of claim 4 wherein said first and second blends are made with the same proportions using known liquids of different flash-points.

7. A method of monitoring at a fixed location along a pipeline passing of an interface between a liquid of high flash-point followed conterminously in the pipeline by a liquid of low flash-point which comprises
- continuously sampling the pipeline liquid at the fixed location,
- blending with the sample a known liquid in known amount to produce a first blend whose flash-point is proximately above the pipeline temperature,
- subjecting said first blend to a substantially continuous flash test,
- determining the instant when said first blend begins to flash at pipeline temperature,
- blending with the sample a known liquid in known amount to produce a second blend whose flash-point is proximately above the pipeline temperature, subjecting said second blend to a substantially continuous flash test, and determining the instant when said second blend begins to flash at pipeline temperature whereby said instants provide a basis for determination of the passage of said interface.

8. The method of claim 7 wherein said first and second blends are made with the same known liquid in different proportions.

9. The method of claim 7 wherein said first and second blends are made with the same proportions using known liquids of different flash-points.

References Cited by the Examiner

UNITED STATES PATENTS

| | | | |
|---|---|---|---|
| 2,627,745 | 2/1953 | Matteson | 73—36 |
| 2,971,365 | 2/1961 | Rhodes et al. | 73—36 X |
| 3,145,561 | 8/1964 | Thompson | 73—36 X |

RICHARD C. QUEISSER, *Primary Examiner.*

J. FISHER, *Assistant Examiner.*